United States Patent [19]
Muckle et al.

[11] Patent Number: 6,124,554
[45] Date of Patent: Sep. 26, 2000

[54] PORTABLE PALLET SCALE

[76] Inventors: Thomas A. Muckle, 4580 Logan Ct., Fremont, Calif. 94536; Randy C. Sievert, 20874 Fargo Dr., Cupertino, Calif. 95014

[21] Appl. No.: 09/323,750

[22] Filed: Jun. 1, 1999

[51] Int. Cl.[7] .............................. G01G 21/00; G01G 19/08
[52] U.S. Cl. .......................... 177/126; 177/130; 177/140
[58] Field of Search ..................................... 177/126, 127, 177/130, 140, 141

[56] References Cited

U.S. PATENT DOCUMENTS

| | | | |
|---|---|---|---|
| 3,561,554 | 2/1971 | Merriam et al. | 177/203 |
| 3,935,913 | 2/1976 | Wagner et al. | 177/134 |
| 4,002,215 | 1/1977 | Harvill | 177/130 |
| 4,248,317 | 2/1981 | Rahav | 177/134 |
| 4,305,475 | 12/1981 | Wacker | 177/147 |
| 4,453,607 | 6/1984 | Zink | 177/179 |
| 4,611,677 | 9/1986 | Yu | 177/187 |
| 5,417,536 | 5/1995 | Cech | 177/140 |
| 5,739,478 | 4/1998 | Zefra | 177/130 |
| 5,990,423 | 11/1999 | Ashpes et al. | 177/140 |

*Primary Examiner*—Randy W. Gibson
*Attorney, Agent, or Firm*—Richard B. Main

[57] ABSTRACT

A portable platform-scale weighing system comprises a floor dolly and lift mechanism that allow a heavy low-profile platform scale to be used practically anywhere truck cargoes need to be weighed. The low-profile platform scale includes a shear-beam load cell on each of four corners that are lifted off the ground by the lift mechanism whenever the dolly is being rolled to a new job. The weighing system puts weight on each of the shear-beam load cells only when the lift system has lowered the low-profile platform scale onto a protective outrigger runner on each side and such runners are resting on the ground. Such runners have turned up steel wings that prevent side impacts to the shear-beam load cells. Various guides and pins keep the low-profile platform scale centered over the floor dolly and lift mechanism so that when it is lowered it will drop properly on the two outrigger runners and minimize contact between the lift mechanism and dolly during the weight mode.

16 Claims, 3 Drawing Sheets

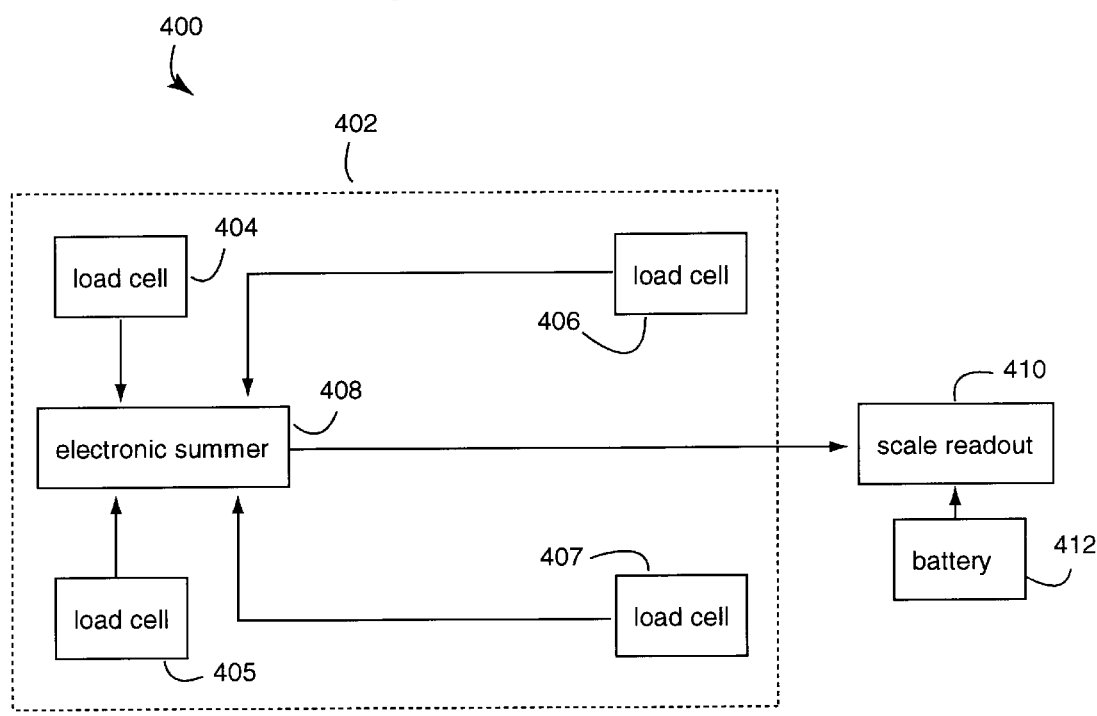

PORTABLE PALLET SCALE

BACKGROUND OF THE INVENTION

1. Field of the Invention

The present invention relates to weighing scales, and more particularly to portable scales that resemble cargo pallets mounted to pallet trucks and that can accurately weigh loads of several thousand pounds.

2. Description of Related Art

Trucking and other shipping companies often charge their customers according to the weight of shipments. So it is important to both the shipper and customer that the weight of a shipment be accurately determined at convenient places.

Typical cargo units are loaded onto trucks using forklifts because they can weigh as much as 5,000 pounds. A scale strong enough and accurate enough to weigh such forklift pallet loads can weigh 200 to 400 pounds itself. So moving such a scale around a loading dock or out to a customer pickup location is very awkward and difficult.

A platform weighing scale is described by Herbert Wagner, et al., in U.S. Pat. No. , 3,935,913, issued Feb. 3, 1976. Such platform weighing scale has a reinforced load cell-supported platform with a frame-like reinforcement. A load-receiving deck or platform is used to define a torsion box frame which resists load-induced deflection of the platform between the load-cell support points. Low profile platform scales for weighing relatively heavy loads are short in overall height, as measured from the floor or other scale-support surface to the top of the load-receiving platform or deck. Scales of this type are especially suitable for weighing loads which are carted by such vehicles as tote bins, push carts, dollies, fork lift trucks and other usually relatively small motor vehicles. Conventional low-profile type platform scales normally do not require installation in a pit to accommodate load-carrying vehicles and roll-on loads in general because the platform is relatively close to the floor surface and can easily be accessed by relatively short, gently sloped ramps. Herbert Wagner, et al., observed that low profile type platform scales offer an advantage of not needing to be installed in a pit. On the other hand, in installations where it is desired to locate the platform flush with the floor surface, only a shallow pit is needed.

U.S. Pat. No. , 3,587,761 issued Jun. 28, 1971 to L. C. Merriam, et al., uses a special structure interposed between each load cell and the platform to avoid side loading of the cells. Such patent illustrates a typical platform structure having a deck plate and reinforcing beams which are seated on the platform-supporting load cells. Other examples of prior weighing scales are shown in U.S. Pat. No. , 3,103,984, which issued to C. L. Ellis, et al., on Sep. 17, 1963; U.S. Pat. No. , 2,962,276, which issued to A. L. Thurston on Nov. 29, 1960; U.S. Pat. No. , 3,679,011, which issued to I. M. Hawver on Jul. 25, 1972; and, U.S. Pat. No. , 3,565,196, which issued to E. Laimins on Feb. 23, 1971.

The prior art has discussed the ill-effects of side loading forces applied to load cells. Such side loading can adversely effect accuracy, and some can permanently damage the load cell. A few researchers have proposed solutions, e.g., U.S. Pat. No. 4,611,677, issued Sep. 16, 1986, titled, Shock Proof Scale; U.S. Pat. No. 4,305,475, issued Dec. 15, 1981 titled, Weigh Block Assembly; U.S. Pat. No. 4,453,607, issued Jun. 12, 1984, titled, Weight Scale With Side Load Protection; U.S. Pat. No. 4,601,356, issued Jul. 22, 1986, titled, Suspended Platform Scale Structure; and, U.S. Pat. No. 4,248, 317, issued Feb. 3, 1981 titled, Load Cell Apparatus

SUMMARY OF THE INVENTION

An object of the present invention is to provide a portable weighing system.

Another object of the present invention is to provide a portable weighing system in which the dolly and lift mechanisms protect the corner load cells from damaging side impacts.

A further object of the present invention is to provide a dolly and lift mechanism that protect the corner load cells on low-profile platform scales from damaging side impacts.

A still further object of the present invention is to provide a dolly and lift mechanism for transporting and operating low-profile platform scales used with truck cargoes.

Briefly, a weighing system embodiment of the present invention comprises a floor dolly and lift mechanism that allow a heavy low-profile platform scale to be used practically anywhere truck cargoes need to be weighed. The low-profile platform scale includes a shear-beam load cell on each of four corners that are lifted off the ground by the lift mechanism whenever the dolly is being rolled to a job. The weighing system puts weight on each of the shear-beam load cells only when the lift system has lowered the low-profile platform scale onto a protective outrigger runner on each side and such runners are resting on the ground. Such runners have turned up steel wings that prevent side impacts to the shear-beam load cells. Various guides and pins keep the low-profile platform scale centered over the floor dolly and lift mechanism so that when it is lowered it will drop properly on the two outrigger runners and minimize contact between the lift mechanism and dolly during the weight mode.

An advantage of the present invention is that a weighing system is provided that is very portable and useful aboard a delivery truck in the field.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 2A represents the low-profile platform scale being assembled to the steerable floor tug. FIG. 2B represents a transport mode. FIG. 2C represents a weighing mode;

FIG. 4 is a schematic diagram of the interconnections between the four load cells, an electronic summer, and an indicator unit in a system similar to those shown in FIGS. 1, 2A–2C and 3.

DETAILED DESCRIPTION OF THE INVENTION

Figure 1:
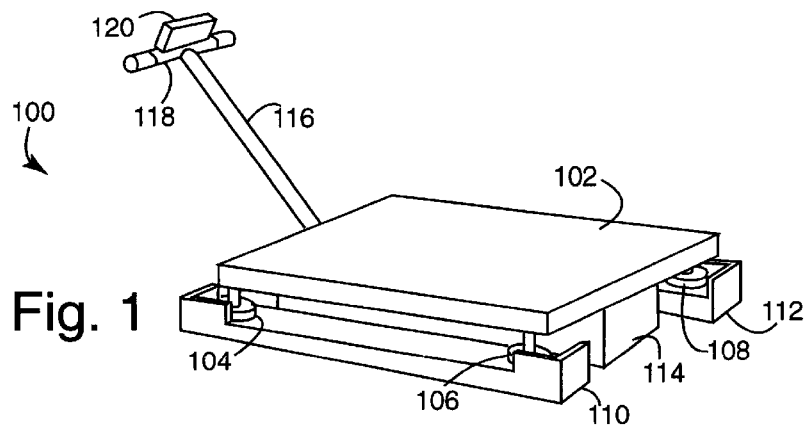
FIG. 1 illustrates a portable weighing scale system embodiment of the present invention.

FIG. 1 illustrates a portable weighing scale system embodiment of the present invention, referred to herein by the reference numeral 100. The portable weighing scale system 100 comprises a load platform 102 that has four shear-beam load cells, one in each corner. The load platform and four load cells can be commercially supplied units. For example, the 6600 model-series ultra low profile floor scale marketed by the Pennsylvania Scale Company (Leola, Pa. 17540 USA) which uses four Sensortronics, Inc. (Covina, Calif. 91722 USA), premium load cells with load cell trimming. Such scales are typically available in platform sizes ranging from 24×24" (61×61 cm) to 60×60" (152×152 cm), and weighing capacities from 1000 lb./500 kg to 5,000 lb./2500 kg. The load platform 102 has a safety diamond-plate deck surface in preferred embodiments.

Each load cell has a downward protruding load-cell foot attached, as represented by the three load cell feet 104, 106, and 108, visible in the perspective of FIG. 1. The four load-cell feet on each side, left and right, are raised above and lowered onto a pair of respective outrigger runners 110 and 112. Such load-cell feet are raised from the outrigger runners 110 and 112 by a dolly 114 when the system is to be moved along the ground. Such outrigger runners 110 and 112 rest on the ground otherwise and the load-cell feet rest on top of them when taking weight measurements.

When a load is to be weighed that is resting on the load platform 102, the load-cell feet are lowered onto the top surfaces of the outrigger runners 110 and 112 by the dolly 114. In the transport mode, such outrigger runners 110 and 112 are designed to drop a bit and this helps provide clearance under the load-cell feet. A handle 116 with a grip 118 allows the dolly 114 to be tugged and steered over a concrete floor into position. A control and display module 120 allows a user to turn on the load cells and see a digital readout of the estimated weight on the load platform 102. The control and display module 120 may be a commercially supplied unit, e.g., the STANDARD indicator by Ohaus Corporation (Florham Park, N.J. 07932 USA).

The outrigger runners 110 and 112 are shown in FIG. 1 with end and side shields that can help to guard the load cell feet from receiving an accidental damaging side impact.

Figure 2A:
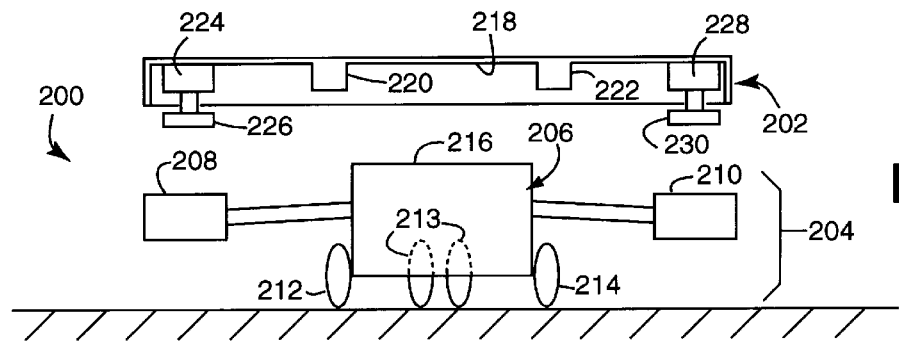
FIGS. 2A–2C are cross-sectional views at various operational times of a pallet-type scale that is similar to the weighing system of FIG. 1.
Figure 2B:
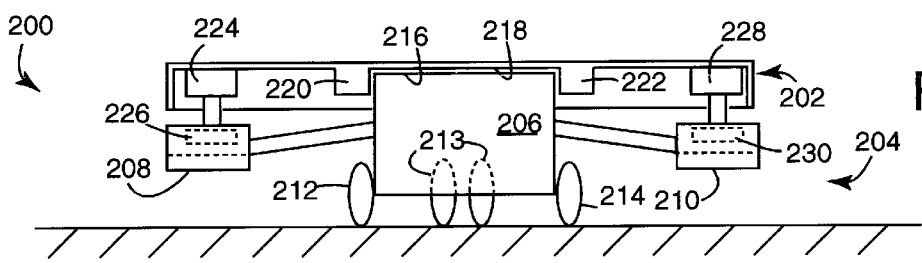

FIGS. 2A–2B are cross-sectional views of a low-profile portable platform scale and dolly 200 which is similar to the weighing system 100 in FIG. 1. A low-profile platform scale 202 is carried by a steerable floor tug dolly 204. FIG. 2A shows the two separated so that FIGS. 2B and 2C will make more sense. A vertically expandable lift unit 206 has a pair of upwardly cupped outrigger runners 208 and 210 supported like wings on struts. A set of four wheels, groups 212–214 are distributed in a tricycle arrangement, and the tandem-wheel group 213 is steerable.

Figure 3:
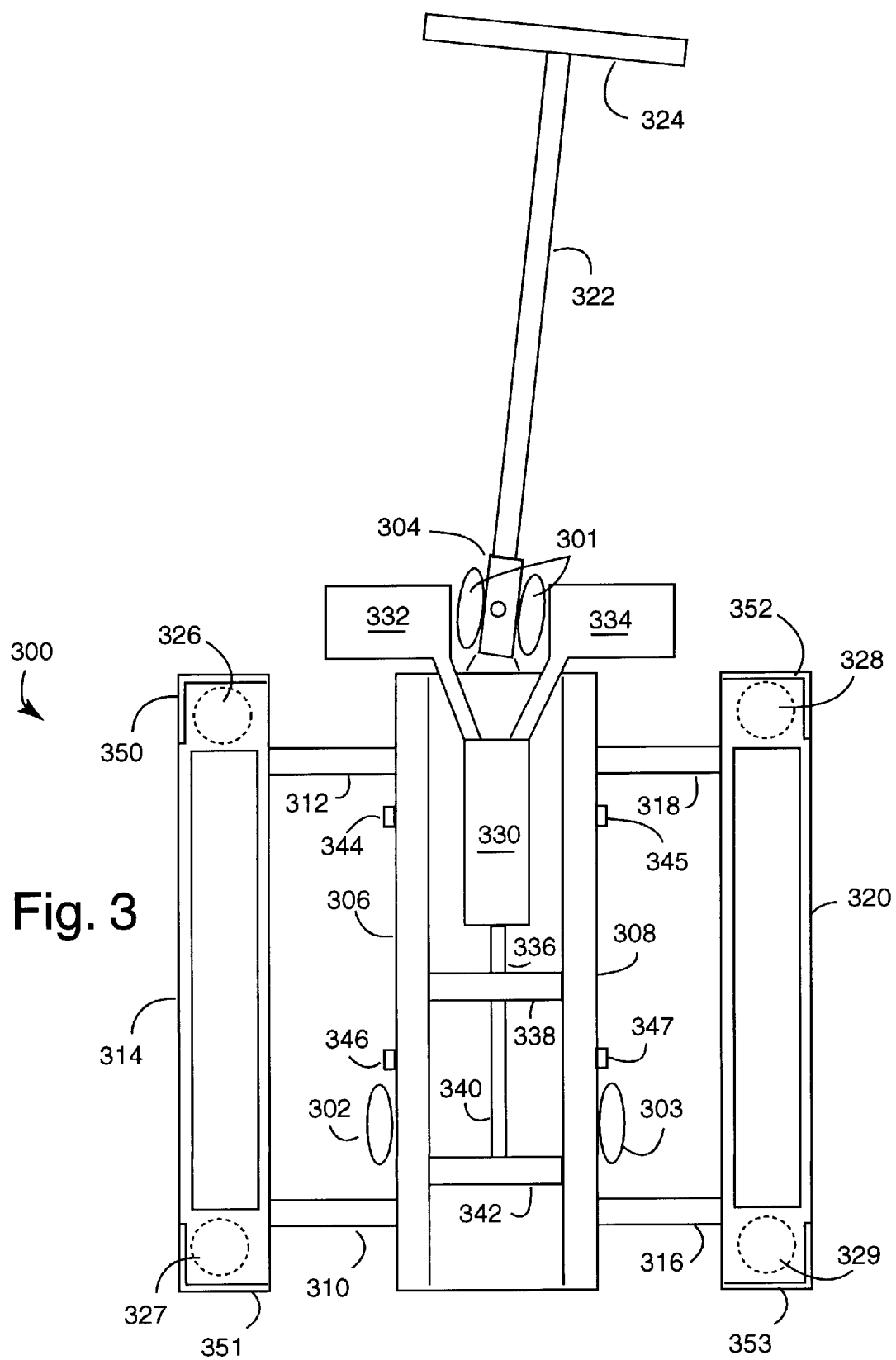
FIG. 3 is a top view of a steerable floor tug embodiment of the present invention, similar to those shown in FIGS. 1 and 2A–2C.

Internal hydraulic units and lift pivots allow the lift unit 206 to raise its upper shell and a top surface 216 to press up against an inside surface 218 of the platform scale 202, as shown in FIG. 2B. Such lifting up will also raise up the outrigger runners 208 and 210 by their struts. A pair of frame channels 220 and 222 that are used mainly to stiffen the platform scale 202 do double duty in keeping the lift unit 206 centered underneath. FIG. 3 shows how pins (344–347) are used to help glide the interface of the top of the lift unit 206 inside the channels 220 and 222 such that snags and hang-ups will not occur that could interfere with the accuracy of the scale.

Figure 2C:
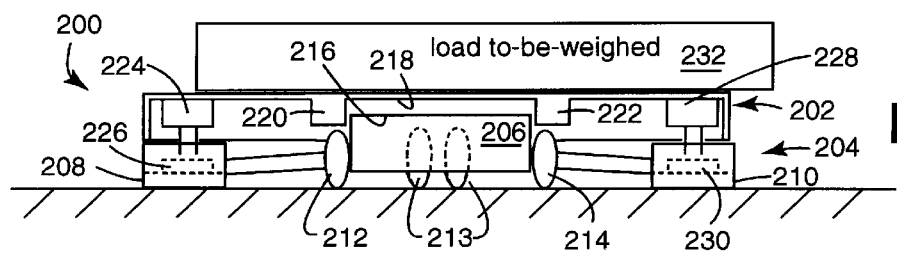

A left-side shear beam load cell 224 and foot 226 either rest on the outrigger runner 208, as shown in FIG. 2C, or are lifted off by the lift unit 206 as shown in FIG. 2B. Similarly, a right-side shear beam load cell and foot 228 and 230 can rest on the outrigger runner 210, as shown in FIG. 2C, or be lifted off by the lift unit 206 as shown in FIG. 2B. FIGS. 2B and 2C show the detail of a well in the outriggers 208 and 210. The feet 226 and 230 will remain inside the well during all times, and drop to the floor of the well during weighing mode, as in FIG. 2C.

FIG. 2C represents the condition where the lift unit 206 has collapsed down and there is a clearance gap left between surfaces 216 and 218. All the weight of a load 232 will therefore be transferred to ground through only the load cells 224 and 228, then through the corner feet 226 and 230, and through the two outrigger runners 208 and 210. In preferred embodiments of the present invention, the load 232 has the clearance all around needed to overhang any of the edges of the platform scale 202.

FIG. 3 represents a top view of a steerable floor tug dolly 300, which is similar to floor tug dolly 204 in FIGS. 2A–2C. The steerable floor tug dolly 300 comprises a tricycle arrangement of three wheels 301–303. Wheel 301 can be a single wheel in the middle of a pivot 304 or a tandem pair of wheels on either side as shown in FIG. 3. A left wheel 302 is attached to a left support plate 306. A right wheel 303 is attached to a right support plate 308. A pair of left struts 310 and 312 support a left outrigger runner 314. A pair of right struts 316 and 318 support a right outrigger runner 320. The pivot 304 can be tugged and steered over a flat floor by a handle 322 with a handgrip 324. A set of four landing areas 326–329 provide a resting place for load cell feet, e.g., such as is illustrated in FIG. 1 for load cell feet 104, 106, and 108, to rest on outrigger runners 110 and 112. The general structure of the steerable floor tug dolly 300 is made of steel, and the outrigger runners 314 and 320 in a prototype were made of u-channel steel sections with plates welded on top to provide for landing areas 326–329. A hydraulic piston 330 is deflated by a release pedal 332 that opens a relief valve, and inflated by a pump-lift pedal 334 that operates a pump. Both the pedals 332 and 334 are equipped with stiff return springs so that they can be foot operated by a user. A shaft 336 connected to the hydraulic piston 330 pushes a lifting arm 338 to rotate and raise the carriage assembly, outrigger assembly, runners and load platform off the ground. A link 340 couples the force of the hydraulic piston 330 to a second rotating lift arm 342 so that the lifting action will maintain any load-weighing platform carried on the backs of the side plates 306 and 308 parallel to the ground.

Referring to the platform scale 200 in FIGS. 2A–2C for a moment, it is critical that the joint between the low-profile platform scale 202 and the steerable floor tug dolly 204 be free floating and able to slide without hanging up when changing from transport mode to weighing mode. So in FIG. 3, the steerable floor tug dolly 300 includes a set of clearance pins 344–347 on the opposite sides of support plates 306 and 308 near the top edges. These prevent a frictional full-surface contact between the vertical surfaces of the low-profile platform scale 202 and the steerable floor tug dolly 204 from interfering with the weight measurement. All the weight of the load 232 must be seen by the load cells in combination and not bypassed by some mechanical snag that might occur. The set of clearance pins 344–347 act as guides and provide for a centering of the platform scale over the lift frame during transitions from said transportation mode to said weighing mode.

A set of four end-and-side guards 350–353 shield the outside approaches to load cell foot landing areas 326–329. These guards protect the shear-beam load cells in the platform scale from receiving accidental damaging side impacts. Alternatively, the runners 314 and 320 could be cupped structural pieces, such as U-channel steel or aluminum with the ends closed off.

In alternative embodiments of the present invention, the wheels 302 and 303 are equipped with brakes that can be set and released with a hand-lever brake at the handgrip 324.

In still other alternative embodiments of the present invention, the release pedal 332 is replaced by a hand-lever release mounted to the handgrip 324.

Embodiments of the present invention share a unique way that the platform scale feet interface with the outrigger runners, or carriage legs. During weighing operations, the platform scale feet are lowered to rest firmly on the carriage legs. However in the transport mode, the platform scale feet are lifted off so they do not contact the carriage legs. This is important for two reasons, hysteresis and mechanical damage.

Load cells and strain gauge sensors work best when the forces acting on them are limited to the vertical axis. Any forces applied to one side, e.g., in any horizontal axis, can cause such sensors to develop a hysteresis where the sensor will not always return to the same "zero" point. This makes any measurements obtained inaccurate. One company, Mettler/Toledo scale company, has recently promoted a "rocker pin assembly" for their platform scales to deal with this issue.

Since even modest side impacts and knocks can effect any shear-beam load cell's accuracy, then a severe horizontal force caused by a collision with another object could cause serious and permanent damage to the load cell. Embodiments of the present invention therefore avoid having an exposure or a mechanical joint between the load cell sensor foot and the outrigger runner or carriage leg. The carriage leg will take the brunt of any horizontal impacts.

FIG. 4 represents the electronics that can be used with the systems illustrated in FIGS. 1, 2A–2C, and 3. An electronic weighing system 400 is used to instrument a low-profile weighing platform 402 that resembles a steel pallet on a pallet floor truck with a hydraulic lift. The weighing platform 402 is generally rectangular or square, e.g., 36" by 36" or 36" by 48", and has a shear-beam load cell 404–407 in each corner. The overall height of a typical system is less than six inches, not counting a tug handle. The individual weight measurements contributed by each load cell 404–407 are summed or added by an electronic summing unit 408. The product of the four weight measurements is digitally displayed to the nearest pound by a scale readout 410, e.g., an Ohaus model I-10. A typical scale system 400 will weigh up to 5,000 pounds. A battery 412 allows the electronic weighing system 400 to operate in any location.

Although particular embodiments of the present invention have been described and illustrated, such is not intended to limit the invention. Modifications and changes will no doubt become apparent to those skilled in the art, and it is intended that the invention only be limited by the scope of the appended claims.

THE INVENTION CLAIMED IS:

1. A platform-scale dolly, comprising:
   a lift frame for elevating a platform scale off its feet such that an included load cell is relieved from supporting a load weight;
   a set of wheels for supporting and rolling the lift frame over a floor surface when said platform scale is elevated during a transportation mode;
   a runner connected to the lift frame such that it will be lifted off said floor surface during said transportation mode and laid to rest during a weighing mode; and
   a landing area on top of the runner upon which said load cell rests during said weighing mode.

2. The dolly of claim 1, further comprising:
   a tug handle connected to the lift frame and the set of wheels such that a user can maneuver the dolly into position over said floor surface during said transportation mode.

3. The dolly of claim 1, wherein:
   the set of wheels comprises a tricycle wheel arrangement in which one wheel is steerable.

4. The dolly of claim 3, further comprising:
   a tug handle connected to the lift frame and said one wheel that is steerable, and such that a user can maneuver the dolly into position over said floor surface during said transportation mode.

5. The dolly of claim 1, further comprising:
   a lateral guard connected to the runner and protecting a side access to the landing area and said load cell, wherein an accidental side impact to said load cell is prevented during said transportation mode.

6. A portable platform-scale system, comprising:
   a platform scale with four corner feet and a low-profile rectangular flat surface, and providing for a weight measurement of a load;
   a load cell connected to each of said four corner feet of the platform scale, and providing for an electronic weight measurement of said load;
   a lift frame for elevating the platform scale off its four feet such that each said load cell is relieved from supporting the weight of said load;
   a set of wheels for supporting and rolling the lift frame over a floor surface when the platform scale is elevated during a transportation mode;
   a set of runners connected to the lift frame such that they will be lifted off said floor surface during said transportation mode and laid to rest during a weighing mode; and
   a set of landing areas on top of the runners upon which each of said load cells rest during said weighing mode.

7. The portable platform-scale system of claim 6, wherein:
   the platform scale has free access all around said flat surface such that said load can overhang without disturbing said electronic weight measurement of said load.

8. The portable platform-scale system of claim 6, further comprising:
   a tug handle connected to the lift frame and the set of wheels such that a user can maneuver the platform scale into position over said floor surface during said transportation mode.

9. The portable platform-scale system of claim 8, further comprising:
   an electronic readout mounted to the tug handle and connected to display a weigh measurement of said load derived from said load cells during said weighing mode.

10. The portable platform-scale system of claim 6, wherein:
    the set of wheels comprises a tricycle wheel arrangement in which one wheel is steerable.

11. The portable platform-scale system of claim 10, further comprising:
    a tug handle connected to the lift frame and said one wheel that is steerable, and such that a user can maneuver the portable platform-scale system into position over said floor surface during said transportation mode.

12. The portable platform-scale system of claim 7, further comprising:
    a lateral guard connected to the runner and protecting a side access to the landing area and said load cell, wherein an accidental side impact to said load cell is prevented during said transportation mode.

13. A portable platform-scale system, comprising:

a platform scale with four corner feet and a low-profile rectangular flat surface, and providing for a weight measurement of a load;

a load cell connected to each of said four corner feet of the platform scale, and providing for an electronic weight measurement of said load;

a lift frame for elevating the platform scale off said four feet such that each said load cell is relieved from supporting the weight of said load;

a set of wheels for supporting and rolling the lift frame over a floor surface when said platform scale is elevated during a transportation mode;

a set of runners connected to the lift frame such that they will be lifted off said floor surface during said transportation mode and laid to rest during a weighing mode;

a set of landing areas on top of the runners upon which each of said load cells rest during said weighing mode;

a tug handle connected to the lift frame and the set of wheels such that a user can maneuver the platform scale into position over said floor surface during said transportation mode;

an electronic readout mounted to the tug handle and connected to display a weigh measurement of said load derived from said load cells during said weighing mode; and a lateral guard connected to each of the set of runners and protecting a side access to the landing areas and said load cells, wherein an accidental side impact to said load cells is prevented during said transportation mode.

14. The portable platform-scale system of claim 13, wherein the platform scale has free access all around said flat surface such that said load can overhang without disturbing said electronic weight measurement of said load.

15. The portable platform-scale system of claim 13, wherein:

the runners drop away from said four corner feet during said transportation mode.

16. The portable platform-scale system of claim 13, further comprising:

guide pins disposed in the lift frame that provide for a centering of the platform scale over the lift frame during transitions from said transportation mode to said weighing mode.

* * * * *